US010642546B2

(12) United States Patent
Utsumi

(10) Patent No.: US 10,642,546 B2
(45) Date of Patent: May 5, 2020

(54) IMAGE FORMING APPARATUS TO PERFORM PRINTING BASED UPON PERMISSION CONDITION

(71) Applicant: KYOCERA Document Solutions Inc., Osaka (JP)

(72) Inventor: Daisuke Utsumi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/230,235

(22) Filed: Dec. 21, 2018

(65) Prior Publication Data

US 2019/0196756 A1 Jun. 27, 2019

(30) Foreign Application Priority Data

Dec. 27, 2017 (JP) ................................ 2017-251428

(51) Int. Cl.
*G06K 15/00* (2006.01)
*G06F 3/12* (2006.01)
*H04N 1/00* (2006.01)

(52) U.S. Cl.
CPC ............ *G06F 3/1222* (2013.01); *G06F 3/129* (2013.01); *G06F 3/1238* (2013.01); *G06F 3/1253* (2013.01); *G06F 3/1258* (2013.01); *G06F 3/1285* (2013.01); *H04N 1/00* (2013.01)

(58) Field of Classification Search
None
See application file for complete search history.

(56) References Cited

U.S. PATENT DOCUMENTS

| 2009/0021765 | A1* | 1/2009 | Takahashi | ........ G03G 15/04018 358/1.14 |
| 2009/0262390 | A1* | 10/2009 | Tanaka | ............... H04N 1/00846 358/1.15 |
| 2009/0268259 | A1* | 10/2009 | Kikuchi | ............. H04N 1/00846 358/468 |
| 2014/0036298 | A1* | 2/2014 | Kimura | ................ H04N 1/4413 358/1.14 |
| 2016/0286085 | A1* | 9/2016 | Wagatsuma | ......... H04N 1/4413 |

FOREIGN PATENT DOCUMENTS

JP 2002-132482 A 5/2002

* cited by examiner

*Primary Examiner* — Henok Shiferaw
(74) *Attorney, Agent, or Firm* — Stein IP, LLC

(57) ABSTRACT

An image forming apparatus includes: a storage portion which stores first data and second data and which stores permission information for determining whether or not permission conditions are satisfied; an image reading portion; a print portion; and a control portion in which when it is determined that a first data output printed material obtained by printing based on the second data is read and the permission conditions are satisfied, printing based on the first data is performed whereas when the permission conditions are not satisfied, the printing based on the first data is prevented from being performed.

16 Claims, 11 Drawing Sheets

SECURITY STORAGE MODE: OFF

IMAGE FORMING APPARATUS TO PERFORM PRINTING BASED UPON PERMISSION CONDITION

INCORPORATION BY REFERENCE

This application is based upon and claims the benefit of priority from the corresponding Japanese Patent Application No. 2017-251428 filed on Dec. 27, 2017, the entire contents of which are incorporated herein by reference.

BACKGROUND

The present disclosure relates to an image forming apparatus which prints images.

Conventionally, various technologies for securely managing confidential information data are proposed.

For example, conventionally, when it is desired to output confidential information data stored in an image forming apparatus, a user needs to input a password into the image forming apparatus. When the password input by the user is correct, the image forming apparatus performs printing based on the confidential information data stored in the image forming apparatus.

SUMMARY

An image forming apparatus of the present disclosure includes a storage portion, an image reading portion, a print portion and a control portion. The storage portion stores first data and second data associated with the first data and stores permission information for determining whether or not a permission condition for permitting the output of the first data is satisfied. The image reading portion reads an image. The print portion prints an image. In the control portion, whether or not a first data output printed material that is a printed material obtained by printing based on the second data is read by the image reading portion is determined, and when it is determined that the first data output printed material is read by the image reading portion and the permission condition is satisfied, the print portion is made to perform printing based on the first data corresponding to the second data whereas when the permission condition is not satisfied, the print portion is prevented from performing the printing based on the first data corresponding to the second data.

BRIEF DESCRIPTION OF THE DRAWINGS

FIG. 5 is a diagram showing the flow of printing when the security storage mode of the multifunctional machine according to the embodiment of the present disclosure is set on;

DETAILED DESCRIPTION

An image forming apparatus according to an embodiment of the present disclosure will be described using, as an example, a multifunctional machine which can perform various types of jobs such as a scan job and a print job.

<Configuration of Multifunctional Machine>

Figure 1:
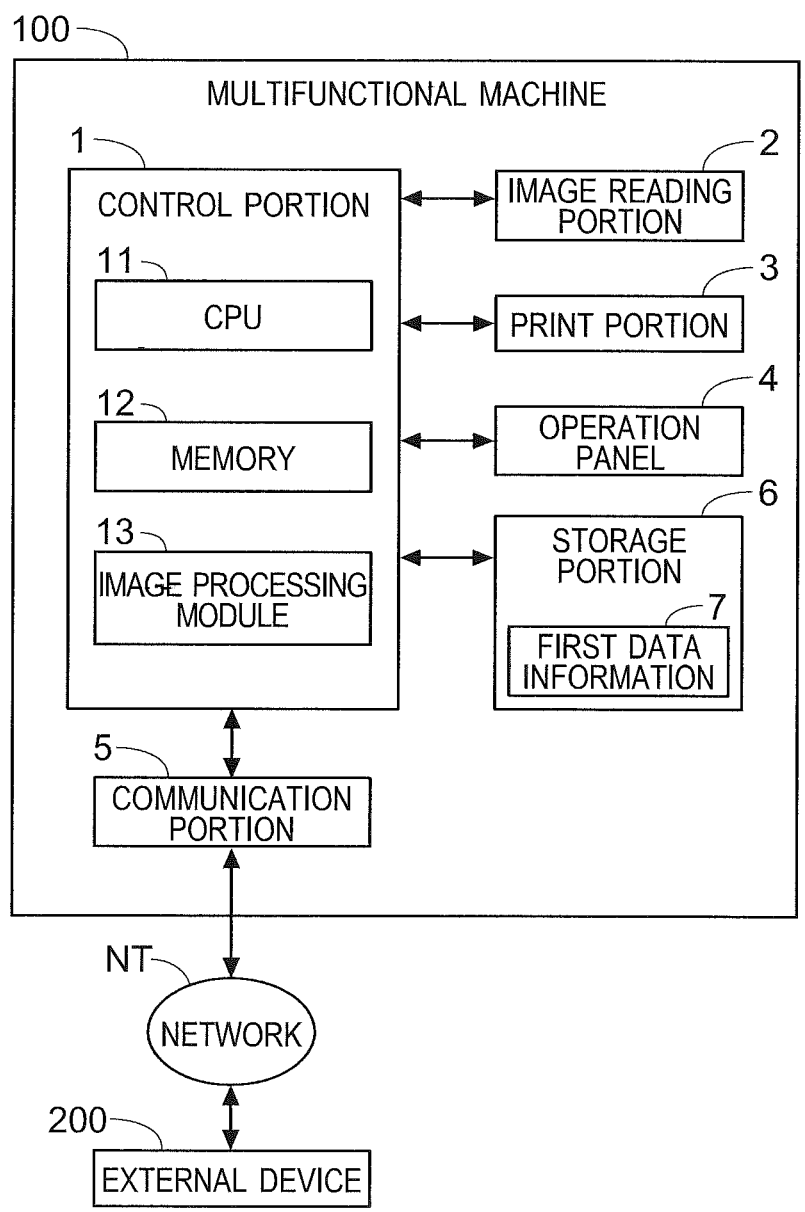
FIG. 1 is a block diagram showing the configuration of a multifunctional machine according to an embodiment of the present disclosure.
Figure 2:
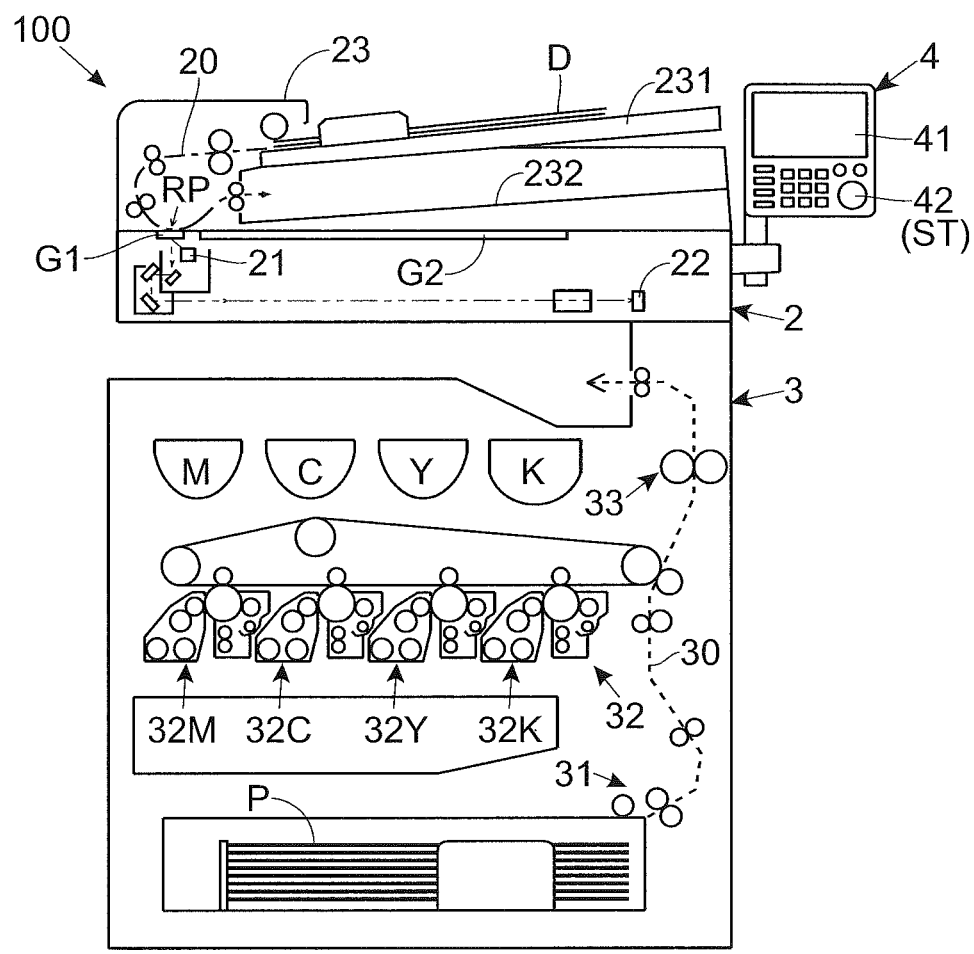
FIG. 2 is a schematic view showing the configuration of the multifunctional machine according to the embodiment of the present disclosure.

As shown in FIGS. 1 and 2, the multifunctional machine 100 of the present embodiment includes a control portion 1. The control portion 1 includes a CPU 11, a memory 12 and an image processing module 13. The CPU 11, the memory 12 and the image processing module 13 are connected to each other. The CPU 11 is operated based on control programs and data so as to perform processing for controlling the individual portions of the multifunctional machine 100. The memory 12 stores the control programs and data for operating the CPU 11.

The image processing module 13 includes a circuit and a memory for performing various types of image processing on image data. The control portion 1 uses the image processing module 13 so as to perform the image processing on the image data.

The multifunctional machine 100 includes an image reading portion 2. The image reading portion 2 is connected to the control portion 1. The control portion 1 controls the reading operation of the image reading portion 2. The image reading portion 2 reads an original document D so as to generate the image data of the original document D.

The image reading portion 2 includes optical members such as a lamp 21 and an image sensor 22 so as to optically read the original document D. The optical members are stored within the housing of the image reading portion 2. A transport reading contact glass G1 and a placement reading contact glass G2 are fitted into the upper surface of the housing of the image reading portion 2. The transport reading contact glass G1 is a contact glass which is used at the time of reading in a transport reading mode, and the placement reading contact glass G2 is a contact glass which is used at the time of reading in a placement reading mode.

The image reading portion 2 includes an original document transport unit 23. The original document transport unit 23 is attached to the upper surface of the housing of the image reading portion 2 such that it can be opened and closed. In the original document transport unit 23, an original document transport path 20, an original document set tray 231 and an original document ejection tray 232 are provided.

The original document transport path 20 is extended from the installation position of the original document set tray 231 through a predetermined position (reading position RP at the time of reading in the transport reading mode) on the transport reading contact glass G1 to the installation position of the original document ejection tray 232. The original document transport unit 23 feeds, to the original document transport path 20, the original document D before reading set on the original document set tray 231, transports the original document D along the original document transport path 20 and ejects the original document D after reading to the original document ejection tray 232.

In the transport reading mode, the original document D is set on the original document set tray 231 by the user. The original document transport unit 23 feeds the original document D set on the original document set tray 231 to the original document transport path 20 and transports the original document D along the original document transport path 20. In this way, the original document D is passed through the reading position RP on the transport reading contact glass G1. The image reading portion 2 reads the original document D which is passed through the reading position RP so as to generate the image data of the original document D.

When a plurality of sheets of original document D are set on the original document set tray 231, the transport of the sheets of original document D to the reading position RP by the original document transport unit 23 is automatically performed one by one. The image reading portion 2 performs continuous reading so as to continuously read the sheets of original document D one by one and thereby generate the image data of the sheets of original document D.

In the placement reading mode, the original document D is set (placed) on the placement reading contact glass G2 by the user. The image reading portion 2 reads the original document D set on the placement reading contact glass G2 so as to generate the image data of the original document D. Here, the original document D set on the placement reading contact glass G2 can be pressed by the original document transport unit 23.

The multifunctional machine 100 includes a print portion 3. The print portion 3 is connected to the control portion 1. The control portion 1 controls the print operation of the print portion 3. The print portion 3 prints an image on a sheet P.

The print portion 3 includes a paper feed portion 31, an image formation portion 32 and a fixing portion 33. The paper feed portion 31 feeds sheets P stored in a cassette to a sheet transport path 30. The sheet P fed to the sheet transport path 30 is transported along the sheet transport path 30.

The image formation portion 32 includes image formation units 32K, 32Y, 32C and 32M which correspond to the individual colors of black (K), yellow (Y), cyan (C) and magenta (M), respectively. The image formation units 32K, 32Y, 32C and 32M individually form the toner images of the corresponding colors, and primarily transfers the toner images to an intermediate belt. The toner images transferred to the intermediate belt are secondarily transferred to the sheet P which is being transported.

The fixing portion 33 pressurizes and heats the sheet P to which the toner images are transferred. In this way, the toner images are fixed to the sheet P. The printed sheet P to which the toner images are fixed is transported as it is along the sheet transport path 30 and is ejected.

The multifunctional machine 100 includes an operation panel 4. The operation panel 4 is connected to the control portion 1. The control portion 1 controls the display operation of the operation panel 4 and detects an operation which is performed on the operation panel 4.

The operation panel 4 includes a touch screen 41 and hardware buttons 42. The touch screen 41 displays a screen on which software buttons are arranged, and detects a touch operation from the user. A plurality of hardware buttons 42 are provided on the operation panel 4. As an example of the hardware buttons 42, there is a start button ST for receiving, from the user, a start operation of providing an instruction to perform a job.

The multifunctional machine 100 includes a communication portion 5. The communication portion 5 is connected to the control portion 1. The control portion 1 controls communication which is performed by the communication portion 5.

The communication portion 5 is an interface for connecting the multifunctional machine 100 to a network NT such as a LAN, and includes a communication circuit, a communication memory, a connection connector and the like. An external device 200 is connected to the network NT. The external device 200 is, for example, a facsimile, a server or a user terminal (personal computer or a smart phone) which is used by the user of the multifunctional machine 100. The communication portion 5 transmits and receives data to and from the external device 200.

The multifunctional machine 100 includes a storage portion 6. The storage portion 6 is connected to the control portion 1. The control portion 1 reads data from the storage portion 6 and writes data into the storage portion 6. Although there is no particular limitation, the storage portion 6 includes a nonvolatile storage device such as a ROM (EEPROM or the like).

<Security Function>
(Outline)

A security function is incorporated in the multifunctional machine 100. The security function is utilized, and thus it is possible to securely manage and carry confidential information on a paper medium. In the security function, the image data of the original document D which is read in the multifunctional machine 100 is a target.

A setting on whether the security function is enabled or disabled is received by the operation panel 4 from the user. When the security function is set enabled, the reception of an instruction to set a security storage mode (which corresponds to a "first data storage mode") on is performed in the operation panel 4. When the security function is set enabled, the reception of an instruction to set a security output mode (which corresponds to a "first data output mode") on is performed in the operation panel 4.

After the security storage mode is set on, the start button ST is operated in a state where the original document D is set in the image reading portion 2, and thus security storage processing is performed in the control portion 1. After the security output mode is set on, the start button ST is operated in the state where the original document D is set in the image reading portion 2, and thus security output processing is performed in the control portion 1.

(Security Storage Processing)

The flow of the security storage processing which is performed by the control portion 1 will be described below with reference to a flowchart shown in FIG. 3.

Figure 3:
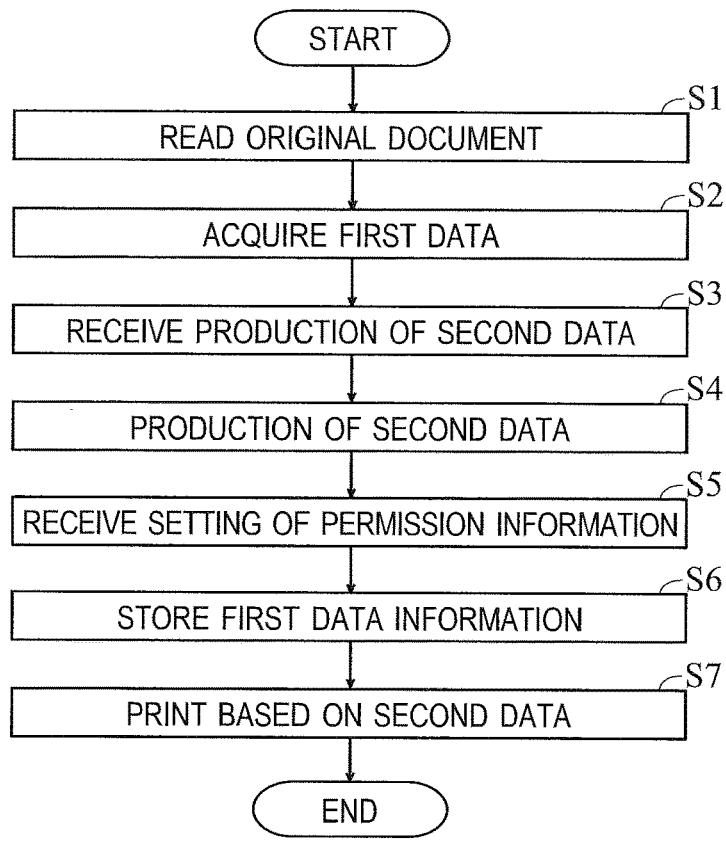
FIG. 3 is flowchart showing the flow of security storage processing which is performed by the multifunctional machine according to the embodiment of the present disclosure.

It is assumed that at the time of start of the flowchart shown in FIG. 3, the original document D (for example, the original document D in which confidential information is described) of data that needs to be stored in the security storage processing is set in the image reading portion 2. When after an instruction to set the security storage mode on is received by the operation panel 4, the control portion 1 detects that the start button ST is operated, the flowchart shown in FIG. 3 is started.

In step S1, the control portion 1 makes the image reading portion 2 start to read the original document D. Then, in step S2, the control portion 1 acquires the image data of the original document D obtained by the reading of the original document D with the image reading portion 2 as data (hereinafter referred to as first data) which needs to be stored in the security storage processing. In other words, the image data of the original document D obtained by the reading of the original document D with the image reading portion 2 in a state where the security storage mode is set on is the first data.

In step S3, the control portion 1 makes the operation panel 4 receive the production of image data (hereinafter referred to as second data) which is associated with the first data. Although there is no particular limitation, the operation panel 4 displays a page production screen (unillustrated) so as to receive a production operation for producing the second data from the user.

For example, as the page production screen, a blank page is provided. Then, the user performs the production operation and thereby can arbitrarily paste a photograph image, a graphic image, a text image or the like to the blank page. Images which can be pasted to the page within the page production screen are previously registered by the user and are stored in the storage portion 6.

On the page production screen, a confirmation button is provided. The operation panel 4 receives an operation on the confirmation button as a confirmation instruction. When the control portion 1 detects that the operation panel 4 receives the confirmation instruction, the process transfers to step S4.

In step S4, the control portion 1 generates the image data of the page which is produced on the page production screen. The image data generated here is the second data.

In step S5, the control portion 1 makes the operation panel 4 receive the setting of permission information for determining whether or not permission conditions for permitting the output of the first data are satisfied. For example, when the operation panel 4 receives the confirmation instruction, the operation panel 4 displays a condition setting screen (unillustrated) so as to receive a condition setting operation for setting the permission information from the user. The permission information will be described in detail later.

In step S6, the control portion 1 stores first data information 7 in the storage portion 6 (see FIG. 1). Here, the control portion 1 associates the first data and the second data with each other so as to include the first data and the second data in the first data information 7 (the first data and the second data are stored in the storage portion 6). The control portion 1 associates the permission information with the first data so as to include the permission information in the first data information 7 (the permission information is stored in the storage portion 6).

In step S7, the control portion 1 provides an output instruction to the print portion 3. When the print portion 3 receives the output instruction from the control portion 1, the print portion 3 performs printing based on the second data (the image data of the page produced on the page production screen). In the following description, a printed material which is obtained by the printing based on the second data is referred to as a first data output printed material.

Figure 4:
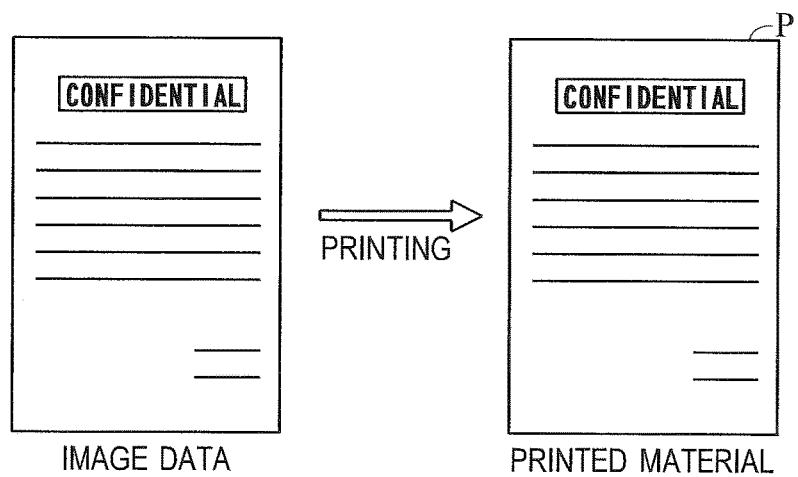
FIG. 4 is a diagram showing the flow of printing when the security storage mode of the multifunctional machine according to the embodiment of the present disclosure is set off.

For example, as shown in FIG. 4, when the security storage mode is not set on (when it is set off), the image data (see the left figure of FIG. 4) of the original document D read by the image reading portion 2 is generated, and printing based on the image data of the original document D is performed. In this way, a printed material (sheet P in which an image based on the image data of the original document D is printed) as shown in the right figure of FIG. 4 is output. In other words, a normal copy job is performed.

Figure 5:
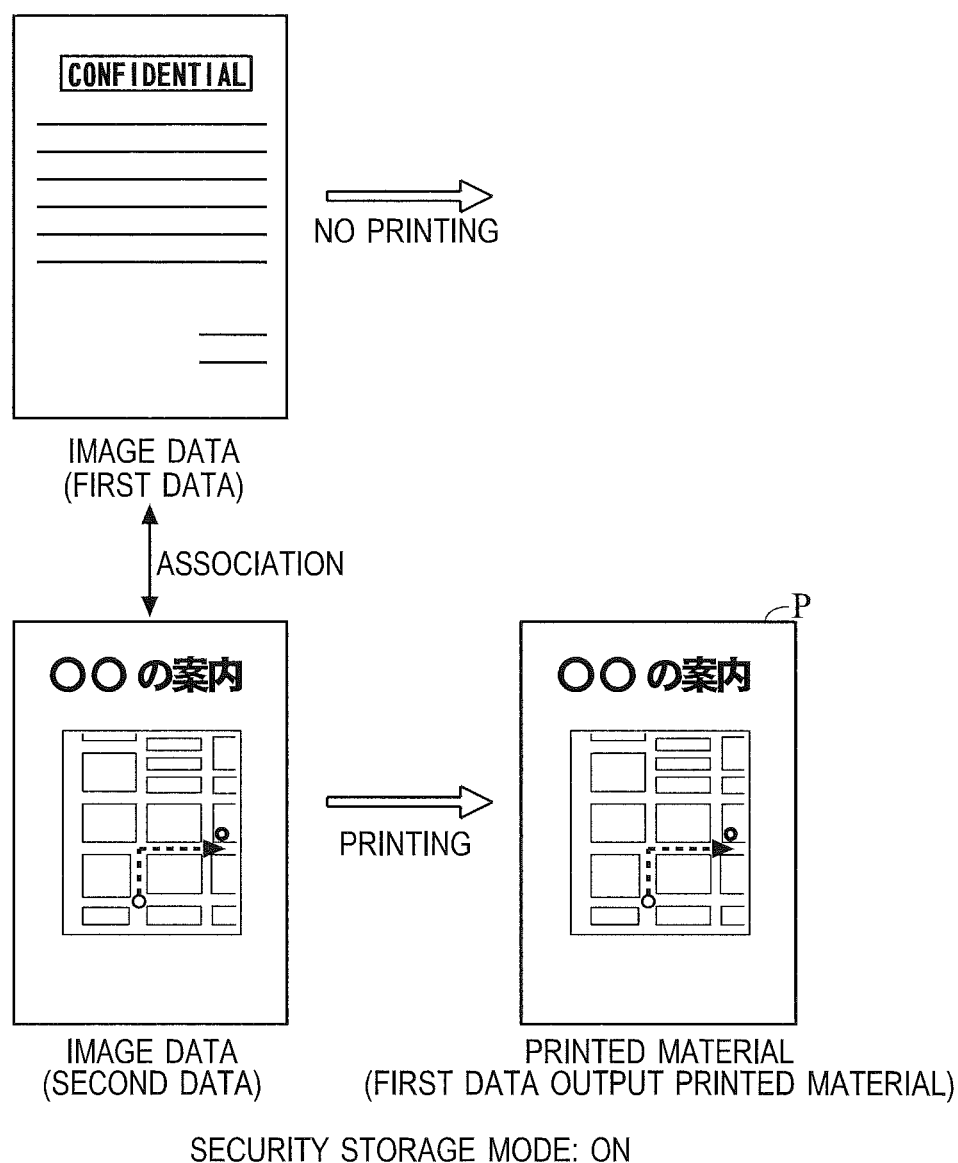

On the other hand, as shown in FIG. 5, when the security storage mode is set on, though the image data (see the upper left figure of FIG. 5) of the original document D read by the image reading portion 2 is generated as the first data, printing based on the first data is not performed. Instead, printing based on the second data which is the image data (see the lower left figure of FIG. 5) of the page produced by the user and which is the image data associated with the first data is performed. In this way, a printed material as shown in the lower right figure of FIG. 5, that is, the first data output printed material (sheet P in which an image based on the second data is printed) is output.

(Security Output Processing)

The flow of the security output processing which is performed by the control portion 1 will be described below with reference to a flowchart shown in FIG. 6.

Figure 6:
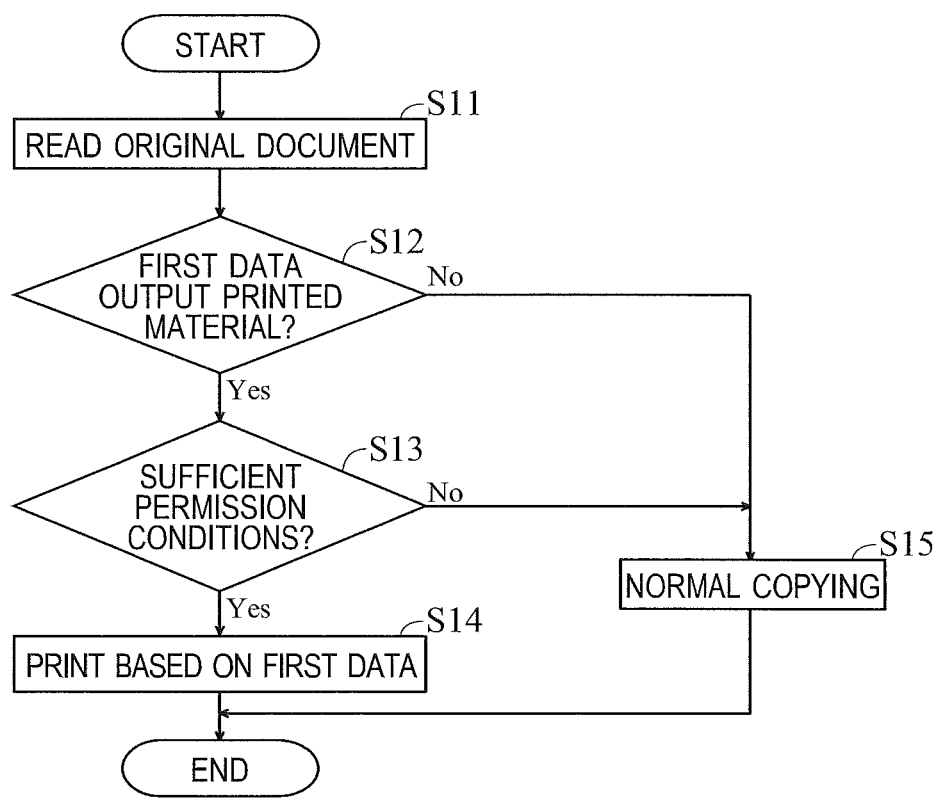
FIG. 6 is flowchart showing the flow of security output processing which is performed by the multifunctional machine according to the embodiment of the present disclosure.

It is assumed that at the time of start of the flowchart shown in FIG. 6, the original document D is set in the image reading portion 2. The original document D may be set in the original document transport unit 23 or the original document D may be set on the placement reading contact glass G2. When after the operation panel 4 receives an instruction to set the security output mode on, the control portion 1 detects that the start button ST is operated, the flowchart shown in FIG. 6 is started.

In step S11, the control portion 1 detects whether or not the original document D is set int the original document transport unit 23, and when the original document D is set in the original document transport unit 23, the control portion 1 makes the image reading portion 2 start to read the original document D in the transport reading mode. On the other hand, when the original document D is not set in the original document transport unit 23, the control portion 1 makes the image reading portion 2 start to read the original document D in the placement reading mode.

In step S12, based on the image data (here referred to as reading image data) of the original document D obtained by the reading of the original document D with the image reading portion 2, the control portion 1 determines whether or not the original document D read by the image reading portion 2 is the first data output printed material. Here, the control portion 1 compares, with the reading image data, the second data which is the image data stored in the storage portion 6 and which is the image data used in the printing of the first data output printed material, and thereby determines whether or not the original document D read by the image reading portion 2 is the first data output printed material. For example, based on the degree of similarity between the second data and the reading image data, the control portion 1 may determine whether or not the original document D read by the image reading portion 2 is the first data output printed material.

When in step S12, the control portion 1 determines that the original document D read by the image reading portion 2 is the first data output printed material, the process transfers to step S13. When the process transfers to step S13, the control portion 1 recognizes, as target second data, the second data which is read this time by the image reading portion 2 and which is used in the printing of the first data output printed material, and recognizes, as target first data, the first data which is associated with the target second data. Then, based on the permission information associated with the target first data, the control portion 1 determines whether or not the permission conditions for permitting the output of the target first data are satisfied. The details thereof will be described later. When as a result, the control portion 1 determines that the permission conditions are satisfied, the process transfers to step S14.

When the process transfers to step S14, the control portion 1 performs processing for outputting the target first data. Here, the control portion 1 provides the output instruction to the print portion 3. When the print portion 3 receives the output instruction, the print portion 3 forms an image based on the target first data so as to print the formed image on the sheet P.

When in step S13, the control portion 1 determines that the permission conditions are not satisfied, the process transfers to step S15. When in step S12, the control portion 1 determines that the original document D read this time by the image reading portion 2 is not the first data output printed material, the process also transfers to step S15. When the process transfers to step S15, the control portion 1 makes the print portion 3 perform printing based on the reading image data obtained by the reading of this time with the image reading portion 2. In other words, even when the original document D read this time by the image reading portion 2 is the first data output printed material, if the control portion 1 determines that the permission conditions are not satisfied or if the control portion 1 determines that the original document D read this time by the image reading portion 2 is not the first data output printed material, the normal copy job is performed.

Figure 7:
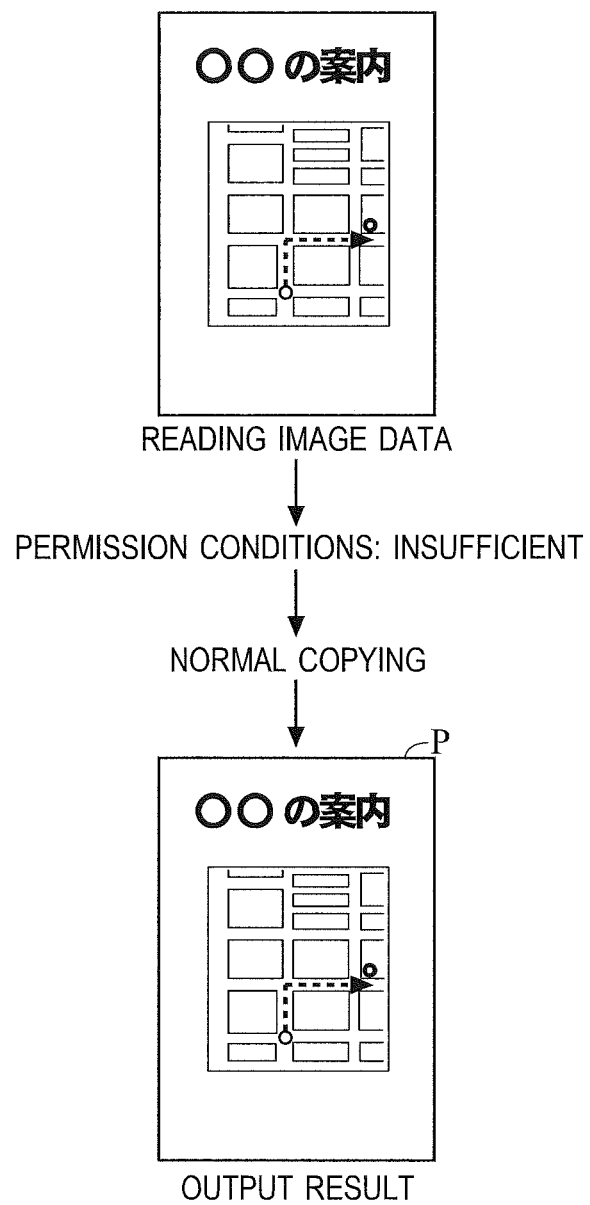
FIG. 7 is a diagram showing the flow of printing when the multifunctional machine according to the embodiment of the present disclosure determines that permission conditions are not satisfied.
Figure 8:
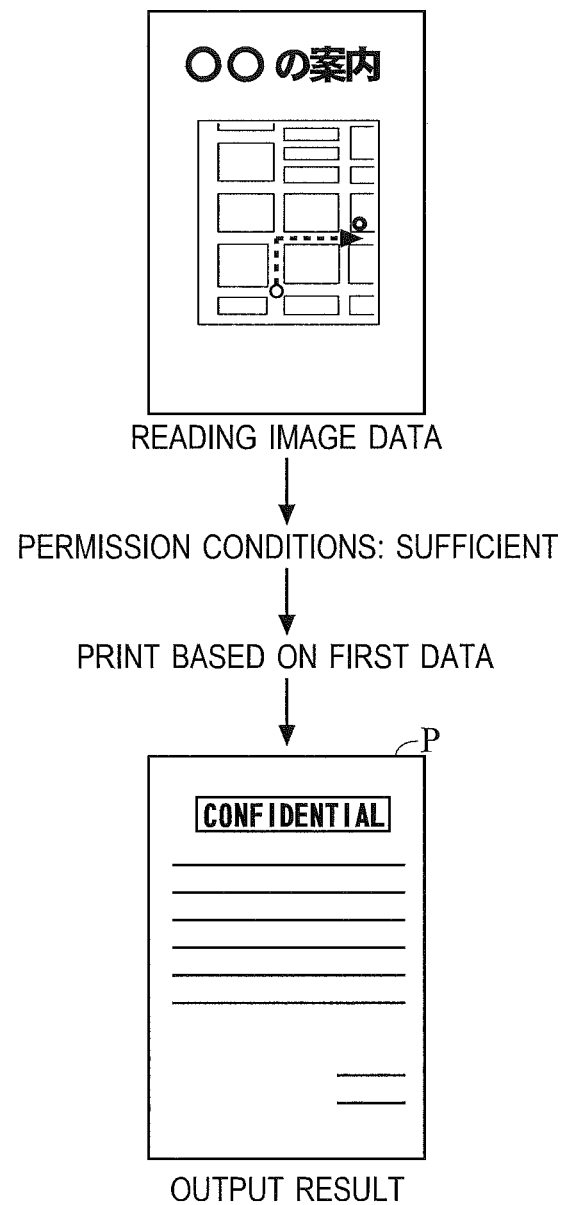
FIG. 8 is a diagram showing the flow of printing when the multifunctional machine according to the embodiment of the present disclosure determines that the permission conditions are satisfied.

For example, it is assumed that reading image data as shown in the upper figures of FIGS. 7 and 8 is obtained by the reading of the original document D with the image reading portion 2 in a state where the security output mode is set on.

In this example, when the control portion 1 determines that the permission conditions are not satisfied, as shown in FIG. 7, printing (normal copy job) based on the reading image data is performed. As a result, a printed material as shown in the lower figure of FIG. 7, that is, a sheet P in which an image based on the reading image data is printed is output.

When the control portion 1 determines that the reading image data is not the second data associated with the first data (that the original document D read by the image reading portion 2 is not the first data output printed material), the printing (normal copy job) based on the reading image data is likewise performed. Furthermore, when the security output mode is not set on, the printing (normal copy job) based on the reading image data is likewise performed.

On the other hand, when the control portion 1 determines that the permission conditions are satisfied, as shown in FIG. 8, printing based on the first data associated with the second data (reading image data) is performed. As a result, a printed material as shown in the lower figure of FIG. 8, that is, the sheet P in which an image based on the first data is printed is output.

As described above, the multifunctional machine 100 (image forming apparatus) of the present embodiment includes: the storage portion 6 which stores the first data and the second data associated with the first data and which stores the permission information for determining whether or not the permission conditions for permitting the output of the first data are satisfied; the image reading portion 2 which reads an image; the print portion 3 which prints the image; and the control portion 1 in which whether or not the first data output printed material that is the printed material obtained by printing based on the second data is read by the image reading portion 2 is determined, and in which when it is determined that the first data output printed material is read by the image reading portion 2 and the permission conditions are satisfied, the print portion 3 is made to perform printing based on the first data associated with the second data whereas when the permission conditions are not satisfied, the print portion 3 is prevented from performing the printing based on the first data associated with the second data.

In the configuration of the present embodiment, the first data output printed material obtained by the printing based on the second data associated with the first data (confidential information data) is read in the multifunctional machine 100, and thus it is possible to output a printed material based on the first data. In other words, it is not necessary to store the first data in a portable storage device such as a USB memory. Here, when the second data whose details are not related to confidential information is associated with the first data, for example, even if the details of the printing of the first data output printed material are seen by a third party while the first data output printed material is being carried, the third party cannot grasp the details of the first data from the details of the printing of the first data output printed material. Even when the third party acquires the first data output printed material in an unauthorized manner so as to read it with the multifunctional machine 100, since the printing based on the first data is performed only when the permission conditions are satisfied, the third party cannot grasp the details of the first data. In this way, it is possible to securely manage and carry confidential information on a paper medium.

<Determination Based on Permission Information>

The setting of information included in the permission information (determination information necessary for determining whether or not the permission conditions are satisfied) can be arbitrarily performed by the user who produces the first data. The user is a user who operates the start button ST in a state where the security storage mode is set on.

Here, determination processing which is performed by the control portion 1 differs according to the determination information included in the permission information. The control portion 1 performs any one of first to seventh determination processing. A specific description will be given below.

(First Determination Processing)

Information which indicates the setting values of setting items on a scan job and a print job can be included in the permission information. Specifically, in step S5 of FIG. 3, the operation panel 4 displays the condition setting screen so as to receive an operation of setting the setting values of setting items as the condition setting operation for setting the permission information. A configuration can be adopted in which the information indicating the setting values of setting items is not included in the permission information.

Various setting values of setting items can be included in the permission information. Examples thereof include the setting values of setting items on the number of sheets printed, the setting values of setting items (for example, the size of the original document, sheet selection and a sheet ejection destination) on original document/sheet/finish, the setting values of setting items (for example, a concentration, color selection, hue adjustment and saturation) on color/image quality and the setting values of setting items (for example, enlargement/reduction, page aggregation and double-sided/division) on layout/edition.

When the control portion 1 determines that the image reading portion 2 reads the first data output printed material, the control portion 1 recognizes the second data (target second data) which is used in the printing of the first data output printed material acquired this time by the image reading portion 2, recognizes the first data (target first data) which is associated with the target second data and determines whether or not the information indicating the setting value of a setting item is included in the permission information associated with the target first data. As a result, when the control portion 1 determines that the information indicating the setting value of the setting item is included in the permission information, in step S13 of FIG. 6, the control portion 1 performs the first determination processing so as to determine whether or not the permission conditions are satisfied.

Specifically, the control portion 1 recognizes, as a confirmation setting value, the setting value of the setting item indicated in the permission information associated with the target first data. The control portion 1 recognizes, among the current setting values of a plurality of setting items (setting values when the image reading portion 2 reads the first data output printed material), the setting value of the setting item corresponding to the setting item of the confirmation setting value as a confirmation target setting value.

Then, when the confirmation setting value is different from the confirmation target setting value, the control portion 1 determines that the permission conditions are not satisfied. In this case, even when the original document D read by the image reading portion 2 is the first data output printed material, the control portion 1 prevents the print portion 3 from performing printing based on the target first data. On the other hand, when the confirmation setting value agrees with the confirmation target setting value, the control portion 1 determines that the permission conditions are satisfied in the first determination processing.

When two or more confirmation setting values are present, that is, when information indicating two or more setting values of setting items is included in the permission information, the control portion 1 determines, for each of the two or more confirmation setting values, whether or not the confirmation setting value is different from the confirmation target setting value. Then, when at least one of the two or more confirmation setting values is different from the corresponding confirmation target setting value, the control portion 1 determines that the permission conditions are not satisfied.

For example, it is assumed that the setting value of the setting item on the number of sheets printed (here, the setting value is set to "three sheets") is included in the permission information. It is also assumed that the setting value of the setting item on the number of sheets printed when the first data output printed material is read by the image reading portion 2 is set to "one sheet".

In this case, the control portion 1 recognizes the "three sheets" of the number of sheets printed as the confirmation setting value, and recognizes the "one sheet" of the number of sheets printed as the confirmation target setting value. In this example, the confirmation setting value is different from the confirmation target setting value. Hence, the control portion 1 determines that the permission conditions are not satisfied.

In a case where the control portion 1 performs the first determination processing (in a case where the information indicating the setting values of setting items is included in the permission information), even when the first data output printed material is read in the multifunctional machine 100, the printed material based on the first data cannot be output unless a plurality of setting values of setting items on a job are set equal to the details of the setting indicated in the permission information. Hence, even when the first data output printed material is acquired by the third party in an unauthorized manner, the output of the printed material based on the first data can be reduced.

(Second Determination Processing)

Information which indicates a permission reading mode of the transport reading mode and the placement reading mode can be included in the permission information. Specifically, in step S5 of FIG. 3, the operation panel 4 displays the condition setting screen so as to receive, as the condition setting operation of setting the permission information, an operation of selecting the permission reading mode of the transport reading mode and the placement reading mode, A configuration can be adopted in which the information indicating the permission reading mode is not included in the permission information.

When the control portion 1 determines that the image reading portion 2 reads the first data output printed material, the control portion 1 determines whether or not the information indicating the permission reading mode is included in the permission information associated with the target first data. As a result, when the control portion 1 determines that the information indicating the permission reading mode is included in the permission information, in step S13 of FIG. 6, the control portion 1 performs the second determination processing so as to determine whether or not the permission conditions are satisfied.

Specifically, the control portion 1 determines whether or not the first data output printed material is read by the image reading portion 2 in the permission reading mode. As a result, when the first data output printed material is read by the image reading portion 2 in a mode different from the permission reading mode, the control portion 1 determines that the permission conditions are not satisfied. On the other hand, when the first data output printed material is read by the image reading portion 2 in the permission reading mode, the control portion 1 determines that the permission conditions are satisfied in the second determination processing.

In a case where the control portion 1 performs the second determination processing (in a case where the information indicating the permission reading mode is included in the permission information), even when the first data output printed material is read in the multifunctional machine 100, the printed material based on the first data cannot be output unless the first data output printed material is set such that the reading is performed in the permission reading mode. Hence, even when the first data output printed material is acquired by the third party in an unauthorized manner, the output of the printed material based on the first data can be reduced.

(Third Determination Processing)

Information which indicates a permission user who permits the provision of the printed material based on the first data can be included in the permission information. Specifically, in step S5 of FIG. 3, the operation panel 4 displays the condition setting screen so as to receive, as the condition setting operation of setting the permission information, an operation of inputting a user ID and a password for the permission user. A configuration can be adopted in which the information indicating the permission user is not included in the permission information.

When the control portion 1 determines that the image reading portion 2 reads the first data output printed material, the control portion 1 determines whether or not the information indicating the permission user is included in the permission information associated with the target first data. As a result, when the control portion 1 determines that the information indicating the permission user is included in the permission information, in step S13 of FIG. 6, the control portion 1 performs the third determination processing so as to determine whether or not the permission conditions are satisfied.

Specifically, the control portion 1 determines whether or not the operation panel 4 receives an instruction to perform user authentication within a predetermined time (for example, several seconds to several tens of seconds) after the completion of the reading of the first data output printed material by the image reading portion 2. As a result, when the operation panel 4 does not receive the instruction to perform the user authentication within the predetermined time, the control portion 1 determines that the permission conditions are not satisfied.

Even when the reading of the first data output printed material by the image reading portion 2 is completed, the operation panel 4 does not automatically display an authentication reception screen (unillustrated) for receiving the instruction to perform the user authentication, and only when the operation panel 4 receives, from the user, an instruction to display the authentication reception screen, the operation panel 4 displays the authentication reception screen. Even when the reading of the first data output printed material by the image reading portion 2 is completed, the operation panel 4 does not provide notification to prompt the user to provide the instruction to perform the user authentication. Hence, when it is desired to output the printed material based on the first data, the user needs to voluntarily provide the instruction to perform the user authentication to the operation panel 4.

When the control portion 1 receives the instruction to perform the user authentication within the predetermined time after the completion of the reading of the first data output printed material by the image reading portion 2, the control portion 1 recognizes information indicating the permission user indicated by the permission information associated with the target first data (here simply referred to as the permission user) so as to perform the user authentication based on the recognized information. Here, the control portion 1 determines whether or not the user who provides the instruction to perform the user authentication (here referred to as an authentication target user) is the permission user.

As a result of the user authentication, when the authentication target user is not the permission user, the control portion 1 determines that the permission conditions are not satisfied. On the other hand, when the authentication target user is the permission user, the control portion 1 determines that the permission conditions are satisfied in the third determination processing.

For example, when the control portion 1 receives the instruction to perform the user authentication, the control portion 1 makes the operation panel receive an input of a user ID and a password. Then, when the user ID and the password which are input by the authentication target user do not respectively agree with the user ID and the password of the permission user, the control portion 1 determines that the permission conditions are not satisfied. There is no particular limitation to a technology which is used in the user authentication, and a face authentication technology, a fingerprint authentication technology or the like may be used.

In a case where the control portion 1 performs the third determination processing (in a case where the information indicating the permission user is included in the permission information), the printed material based on the first data cannot be output unless the instruction to perform the user authentication is provided within the predetermined time after the completion of the reading of the first data output printed material in the multifunctional machine 100. Even when the instruction to perform the user authentication is provided within the predetermined time, the printed material based on the first data cannot be output unless the authentication target user is the permission user. Hence, even when the first data output printed material is acquired by the third party in an unauthorized manner, the output of the printed material based on the first data can be reduced.

(Fourth Determination Processing)

Information which indicates the expiration date of the first data output printed material can be included in the permission information. Specifically, in step S5 of FIG. 3, the operation panel 4 displays the condition setting screen so as to receive, as the condition setting operation of setting the permission information, an operation of inputting the expiration date. A configuration can be adopted in which the information indicating the expiration date is not included in the permission information.

When the control portion 1 determines that the image reading portion 2 reads the first data output printed material, the control portion 1 determines whether or not the information indicating the expiration date is included in the permission information associated with the target first data. As a result, when the control portion 1 determines that the information indicating the expiration date is included in the permission information, in step S13 of FIG. 6, the control portion 1 performs the fourth determination processing so as to determine whether or not the permission conditions are satisfied.

Specifically, the control portion 1 recognizes the date and time when the control portion 1 determines that the image reading portion 2 reads the first data output printed material, and determines whether or not the recognized date and time (here referred to as the current date and time) exceeds the expiration date indicated in the permission information associated with the target first data (here simply referred to as the expiration date). As a result, when the current date and time exceeds the expiration date, the control portion 1 determines that the permission conditions are not satisfied. On the other hand, when the current date and time does not exceed the expiration date, the control portion 1 determines that the permission conditions are satisfied in the fourth determination processing.

In a case where the control portion 1 performs the fourth determination processing (in a case where the information indicating the expiration date is included in the permission information), even when the first data output printed material is read in the multifunctional machine 100, if the current date and time exceeds the expiration date indicated in the permission information, the printed material based on the first data cannot be output. Hence, even when the first data output printed material is acquired by the third party in an unauthorized manner, the output of the printed material based on the first data can be reduced.

(Fifth Determination Processing)

Information which indicates the upper limit of the number of times a job involving the reading of the first data output printed material is performed can be included in the permission information. Specifically, in step S5 of FIG. 3, the operation panel 4 displays the condition setting screen so as to receive, as the condition setting operation of setting the permission information, an operation of inputting the upper limit of the number of times. A configuration can be adopted in which the information indicating the upper limit of the number of times is not included in the permission information.

When the control portion 1 determines that the image reading portion 2 reads the first data output printed material, the control portion 1 determines whether or not the information indicating the upper limit of the number of times is included in the permission information associated with the target first data. As a result, when the control portion 1 determines that the information indicating the upper limit of the number of times is included in the permission information, in step S13 of FIG. 6, the control portion 1 performs the fifth determination processing so as to determine whether or not the permission conditions are satisfied.

Specifically, a count value is included in the permission information (permission information including the information indicating the upper limit of the number of times). The count value indicated in the permission information is updated by the control portion 1. When the control portion 1 performs the job involving the reading of the first data output printed material by the image reading portion 2, the control portion 1 increments, by one, the count value of the permission information associated with the target first data (first data associated with the target second data which is the second data used in the printing of the first data output printed material read this time by the image reading portion 2).

Then, the control portion 1 updates the count value of the permission information associated with the target first data, and thereafter recognizes the updated count value, that is, the number of times (cumulative value) the job involving the reading of the first data output printed material (printed material based on the target second data) is performed.

As a result, when the recognized number of times the job is performed reaches the upper limit of the number of times indicated in the permission information associated with the target first data, the control portion 1 determines that the permission conditions are not satisfied. On the other hand, when the recognized number of times the job is performed does not reach the upper limit of the number of times indicated in the permission information associated with the target first data, the control portion 1 determines that the permission conditions are satisfied in the fifth determination processing.

In a case where the control portion 1 performs the fifth determination processing (in a case where the information indicating the upper limit of the number of times is included in the permission information), even when the first data output printed material is read in the multifunctional machine 100, if the number of times the job involving the reading of the first data output printed material is performed reaches the upper limit of the number of times indicated in the permission information, the printed material based on the first data cannot be output. Hence, even when the first data output printed material is acquired by the third party in an unauthorized manner, the output of the printed material based on the first data can be reduced.

(Sixth Determination Processing)

Information which indicates the position of a check region that is the target region of detection processing to be described later can be included in the permission information. Specifically, in step S5 of FIG. 3, the operation panel 4 displays the condition setting screen so as to receive, as the condition setting operation of setting the permission information, an operation of setting the position of the check region. A configuration can be adopted in which the information indicating the position of the check region is not included in the permission information.

For example, in step S5 of FIG. 3, the operation panel 4 receives, from the user, whether or not the position of the check region is set. When the operation panel 4 receives the information indicating that the position of the check region is set, the operation panel 4 displays the page produced in step S3 of FIG. 3 on the condition setting screen so as to receive, from the user, an operation of specifying the check region within the page displayed on the condition setting screen.

When the control portion 1 determines that the image reading portion 2 reads the first data output printed material, the control portion 1 determines whether or not the information indicating the position of the check region is included in the permission information associated with the target first data. As a result, when the control portion 1 determines that the information indicating the position of the check region is included in the permission information, in step S13 of FIG. 6, the control portion 1 performs the sixth determination processing so as to determine whether or not the permission conditions are satisfied.

Specifically, when the image reading portion 2 reads the first data output printed material, the control portion 1 performs the detection processing for detecting a predetermined image (for example, an image of a handwritten checkmark) from the check region of the image data of the first data output printed material obtained by the reading. As a result, when the predetermined image cannot be detected, the control portion 1 determines that the permission conditions are not satisfied. On the other hand, when the predetermined image can be detected, the control portion 1 determines that the permission conditions are satisfied in the sixth determination processing.

Figure 9:
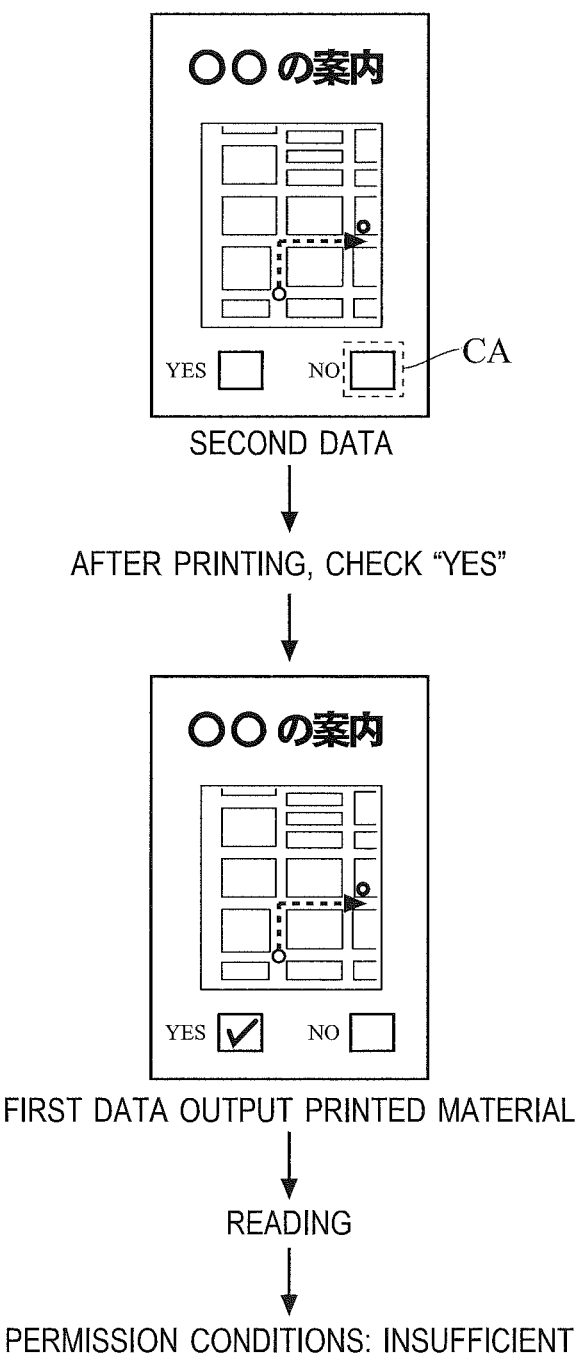
FIG. 9 is a diagram showing the flow of sixth determination processing which is performed by the multifunctional machine according to the embodiment of the present disclosure.
Figure 10:
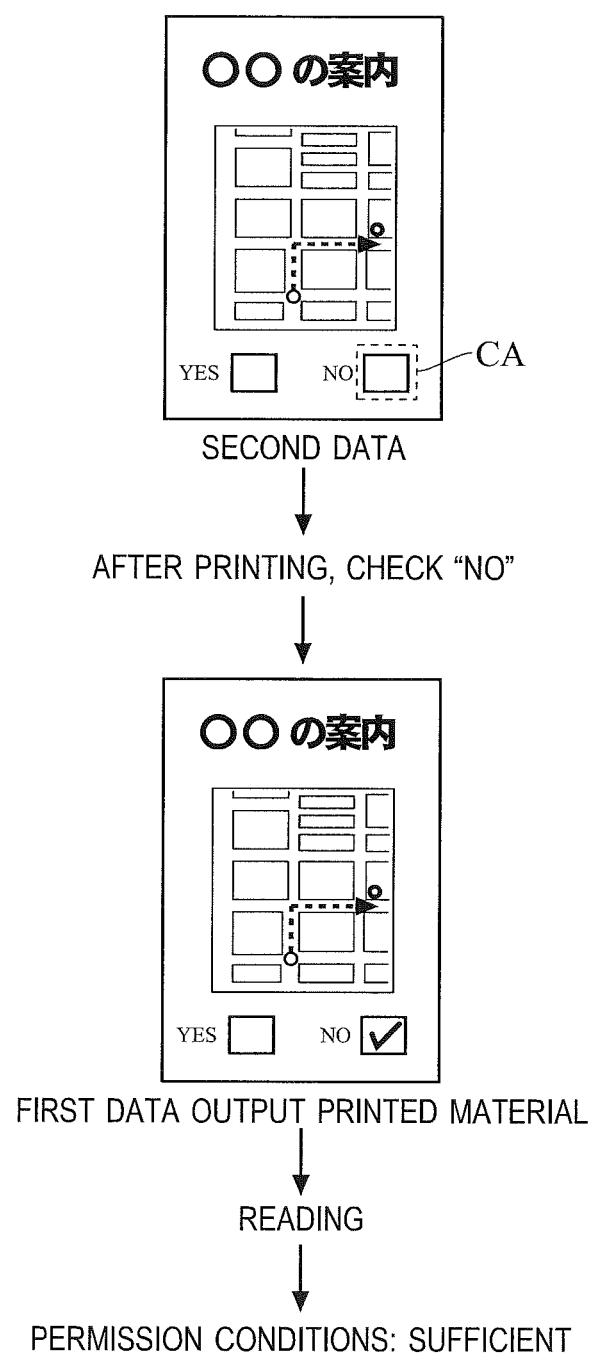
FIG. 10 is a diagram showing the flow of the sixth determination processing which is performed by the multifunctional machine according to the embodiment of the present disclosure.

For example, it is assumed that the image data of a page as shown in the upper figures of FIGS. 9 and 10 is produced as the second data which is associated with the first data. It is also assumed that a region enclosed by broken lines is specified as a check region CA.

In this case, when as shown in FIG. 9, a checkmark is handwritten in a check box with "YES" in the first data output printed material printed based on the second data, and the first data output printed material is read, the sixth determination processing by the control portion 1 results in insufficient conditions. Although not shown in the figure, the same is true for a case where a checkmark is not handwritten in any of the check box with "YES" and a check box with "NO."

On the other hand, when as shown in FIG. 10, a checkmark is handwritten in the check box with "NO" in the first data output printed material printed based on the second data, and the first data output printed material is read, the sixth determination processing by the control portion 1 results in sufficient conditions.

In a case where the control portion 1 performs the sixth determination processing (in a case where the information indicating the position of the check region CA is included in the permission information), even when the first data output printed material is read in the multifunctional machine 100, the printed material based on the first data cannot be output unless the checkmark is handwritten in the position corresponding to the check region CA of the first data output printed material. Hence, even when the first data output printed material is acquired by the third party in an unauthorized manner, the output of the printed material based on the first data can be reduced.

(Seventh Determination Processing)

Information which indicates the reading turn of the first data output printed material can be included in the permission information. Specifically, in step S5 of FIG. 3, the operation panel 4 displays the condition setting screen so as to receive, as the condition setting operation of setting the permission information, an operation of setting reading turns. A configuration can be adopted in which the information indicating the reading turns is not included in the permission information. Here, when the reading turns are included in the permission information, determination image data (image data used in the seventh determination processing) can be further included in the permission information.

When the control portion 1 determines that the image reading portion 2 reads the first data output printed material, the control portion 1 determines whether or not the information indicating the reading turns is included in the permission information associated with the target first data. As a result, when the control portion 1 determines that the information indicating the reading turns is included in the permission information, in step S13 of FIG. 6, the control portion 1 performs the seventh determination processing so as to determine whether or not the permission conditions are satisfied.

Specifically, when the first data output printed material is read by the image reading portion 2, the control portion 1 determines whether or not the continuous reading is performed in which a plurality of sheets of original document D including the first data output printed material are continuously read. As a result, when the continuous reading is not performed, the control portion 1 determines that the permission conditions are not satisfied.

When the continuous reading is performed, the control portion 1 recognizes the reading turns (here referred to as permission reading turns) indicated in the permission information associated with the target first data. Then, when the reading turn of the first data output printed material in the continuous reading is different from the permission reading turn, even if the continuous reading is performed, the control portion 1 determines that the permission conditions are not satisfied.

Furthermore, the control portion 1 extracts the image data of the sheets of original document D (here referred to as the other sheets of original document D) other than the first data output printed material read in the continuous reading. Then, the control portion 1 determines the degree of similarity between the determination image data included in the permission information associated with the target first data and the image data of the other sheets of original document D, and when the determined degree of similarity falls below a predetermined threshold value, the control portion 1 determines, regardless of the reading turn of the first data output printed material, that the permission conditions are not satisfied.

On the other hand, when the reading turn of the first data output printed material in the continuous reading is the same as the permission reading turn, and the degree of similarity of the other sheets of original document D is equal to or more than the threshold value, the control portion 1 determines that the permission conditions are satisfied in the seventh determination processing.

For example, it is assumed that the permission reading turn of the first data output printed material is set to the second and the determination image data is the image data of a blank page. In this case, when only the first data output printed material is read, the seventh determination processing by the control portion 1 results in insufficient conditions. When the continuous reading is performed such that the first data output printed material and the other sheets of original document D are read in this order, the seventh determination processing by the control portion 1 also results in insufficient conditions. Furthermore, even when the continuous reading is performed such that the other original document D and the other sheets of original document D are read in this order, the seventh determination processing by the control portion 1 also results in insufficient conditions unless the other sheets of original document D are blank sheets of original document D. In this example, only when the continuous reading is performed such that the blank sheets of original document D and the first data output printed material are read in this order, the seventh determination processing by the control portion 1 results in sufficient conditions.

In a case where the control portion 1 performs the seventh determination processing (in a case where the information indicating the reading turns is included in the permission information), even when the first data output printed material is read in the multifunctional machine 100, the printed material based on the first data cannot be output unless the continuous reading is not performed whereas even when the continuous reading is performed, if the reading turn of the first data output printed material is different from the reading turn indicated in the permission information, the printed material based on the first data cannot be output. Hence, even when the first data output printed material is acquired by the third party in an unauthorized manner, the output of the printed material based on the first data can be reduced.

(A Plurality of Types of Determination Processing)

When only one type of determination information is included in the permission information associated with the target first data, the control portion 1 performs only the determination processing corresponding to the one type of determination information so as to determine whether or not the permission conditions are satisfied.

For example, it is assumed that only the information (information corresponding to the first determination processing) indicating the setting values of setting items is included in the permission information associated with the target first data. In this case, the control portion 1 performs only the first determination processing. Then, when the confirmation setting value is different from the confirmation target setting value, the control portion 1 determines that the permission conditions are not satisfied so as to prevent the print portion 3 from performing the printing based on the target first data. On the other hand, when the confirmation setting value is the same as the confirmation target setting value, the control portion 1 determines that the permission conditions are satisfied so as to allow the print portion 3 to perform the printing based on the target first data.

For example, it is assumed that only the information (information corresponding to the second determination processing) indicating the permission reading mode is included in the permission information associated with the target first data. In this case, the control portion 1 performs only the second determination processing. Then, when the first data output printed material is read in a mode different from the permission reading mode, the control portion 1 determines that the permission conditions are not satisfied so as to prevent the print portion 3 from performing the printing based on the target first data. On the other hand, when the first data output printed material is read in the permission reading mode, the control portion 1 determines that the permission conditions are satisfied so as to allow the print portion 3 to perform the printing based on the target first data.

When a plurality of types of determination information are included in the permission information associated with the target first data, the control portion 1 performs a plurality of types of determination processing corresponding to the types of determination information. Then, the control portion 1 determines, based on the individual results of the types of determination processing, whether or not the permission conditions are satisfied.

For example, it is assumed that the information (information corresponding to the first determination processing) indicating the setting values of setting items and the information (information corresponding to the second determination processing) indicating the permission reading mode are included in the permission information associated with the target first data. In this case, the control portion 1 performs the first determination processing and the second determination processing.

Then, in this example, it is assumed that the confirmation setting value is the same as the confirmation target setting value and that the first data output printed material is read in a mode different from the permission reading mode. In this case, the control portion 1 determines that the permission conditions are not satisfied so as to prevent the print portion 3 from performing the printing based on the target first data. On the other hand, when the confirmation setting value is the same as the confirmation target setting value, and the first data output printed material is read in the permission reading mode, the control portion 1 determines that the permission conditions are satisfied so as to allow the print portion 3 to perform the printing based on the target first data.

As described above, in a case where among the first to seventh determination processing, a plurality of types of determination processing are performed by the control portion 1 (in a case where a plurality of types of determination information are included in the permission information associated with the target first data), when in the results of all the types of determination processing, the permission conditions are satisfied, the printing based on the target first data is performed. In other words, when in the result of any one of the types of determination processing, the permission conditions are not satisfied, the printing based on the target first data is not performed.

<Deletion of Second Data>

When the control portion 1 performs the determination processing (any one of the first to seventh determination processing) based on the permission information associated with the target first data so as to determine that the permission conditions are not satisfied, the control portion 1 performs second data deletion processing for deleting, from the storage portion 6, the target second data associated with the target first data. Even when the control portion 1 performs a plurality of types of determination processing among the first to seventh determination processing so as to determine that in any one of the types of determination processing, the permission conditions are not satisfied, the control portion 1 performs the second data deletion processing.

In an example, when the information (determination information) indicating the upper limit of the number of times is included in the permission information associated with the target first data, the control portion 1 performs the fifth determination processing. In this case, when the number of times the job involving the reading of the first data output printed material (the printed material based on the target second data) is performed reaches the upper limit of the number of times, the control portion 1 determines that the permission conditions are not satisfied. Hence, the control portion 1 performs the second data deletion processing.

In another example, when the information (determination information) indicating the setting values of setting items is included in the permission information associated with the target first data, the control portion 1 performs the first determination processing. In this case, when the confirmation setting value is different from the confirmation target setting value, the control portion 1 determines that the permission conditions are not satisfied. Hence, the control portion 1 performs the second data deletion processing.

Here, a configuration may be adopted in which the setting value of any one of the setting values that can be included as the determination information in the permission information can be specified as a non-target setting value. When the confirmation setting value which is specified as the non-target is different from the confirmation target setting value, the control portion 1 determines that the permission conditions are not satisfied but does not perform the second data deletion processing.

When the control portion 1 determines that the image reading portion 2 reads the first data output printed material, the control portion 1 recognizes a waiting time after the operation panel 4 receives an instruction to set the security output mode (first data output mode) on until the start when the first data output printed material is read this time by the image reading portion 2. The control portion 1 determines whether or not the waiting time exceeds a predetermined threshold time. When the waiting time exceeds the threshold time, the control portion 1 performs the second data deletion processing.

Here, that the control portion 1 determines that the permission conditions are not satisfied means that the first data output printed material may be acquired by the third party in an unauthorized manner. When the waiting time exceeds the threshold time, it is likely that the third party who acquires the first data output printed material in an unauthorized manner performs various operations in order to output the printed material based on the first data. Hence, when the permission conditions are not satisfied or when the waiting time exceeds the threshold time, it is preferable to delete the second data so as to prevent the printed material based on the first data from being output.

<Notification to Notification Destination>

The first data information 7 includes information indicating a notification destination (address) which is registered by the producer of the first data (producer of the second data associated with the first data). In other words, the notification destination associated with the first data is stored in the storage portion 6. For example, the external device 200 (a personal computer or a smart phone) which can be connected to the network NT can be registered as the notification destination. In an example, the external device 200 which is used by the manager of the multifunctional machine 100 or the external device 200 which is used by the producer of the first data is set to the notification destination.

When the control portion 1 determines that the permission conditions are not satisfied, the control portion 1 performs notification processing for notifying, through the communication portion 5, the notification destination associated with the target first data of notification information indicating that the first data output printed material is read. Here, the control portion 1 includes, in the notification information, job information indicating the details of the job (which is the job that is performed this time and which is referred as a target job here) involving the reading of the first data output printed material.

There is no particular limitation to the details of the job information which is included in the notification information. For example, information indicating the details of the setting of the target job is included in the notification information. As the information indicating the details of the setting of the target job, the type of target job, the setting values of a plurality of setting items when the target job is performed (for example, setting values which are changed from default values) and the like are present.

The notification information as described above is notified, and thus the user who receives the notification of the notification information can determine whether or not the first data output printed material is used in an unauthorized manner (whether or not the first data output printed material is acquired by the third party in an unauthorized manner).

A configuration may be adopted in which when the control portion 1 determines that the permission conditions are not satisfied, the control portion 1 is prevented from performing the second data deletion processing and is made to perform only the notification processing. In this way, after the reception of the notification information, it is possible to determine whether or not the second data should be deleted, with the result that the convenience of the user is enhanced.

<Copying of First Data Output Printed Material>

When the start button ST is operated in a state where the security output mode is set on, if the original document D is set in the image reading portion 2, the control portion 1 makes the image reading portion 2 read the original document D so as to determine whether or not the original document D read this time by the image reading portion 2 is the first data output printed material, and when the original document D is the first data output printed material, the control portion 1 determines whether or not the permission conditions are satisfied. As a result, when the permission conditions are not satisfied, the control portion 1 determines that the operation panel 4 receives an instruction to perform a copy job so as to perform the copy job.

When the start button ST is operated in a state where the security output mode is set off, if the original document D is set in the image reading portion 2, the control portion 1 determines that the operation panel 4 receives the instruction to perform the copy job. Even in this case, the control portion 1 determine whether or not the original document D read this time by the image reading portion 2 is the first data output printed material so as to perform the copy job.

When the control portion 1 performs the copy job for copying the image of the first data output printed material on the sheet P, the control portion 1 performs data change processing for changing part of the image data of the first data output printed material obtained by the reading of the image reading portion 2. In other words, the control portion 1 performs the data change processing on the image data of the first data output printed material so as to newly generate image data which is used in the copy job. Then, the control portion 1 makes the print portion 3 perform printing based on the changed image data (newly generated image data). In this way, a printed material in which part of the image of the first data output printed material is changed (changed printed material) is output.

The control portion 1 performs, as the data change processing, processing for changing the color of part of the image data of the first data output printed material. Alternatively, the control portion 1 performs, as the data change processing, processing for adding a predetermined mark image to part of the image data of the first data output printed material.

Figure 11:
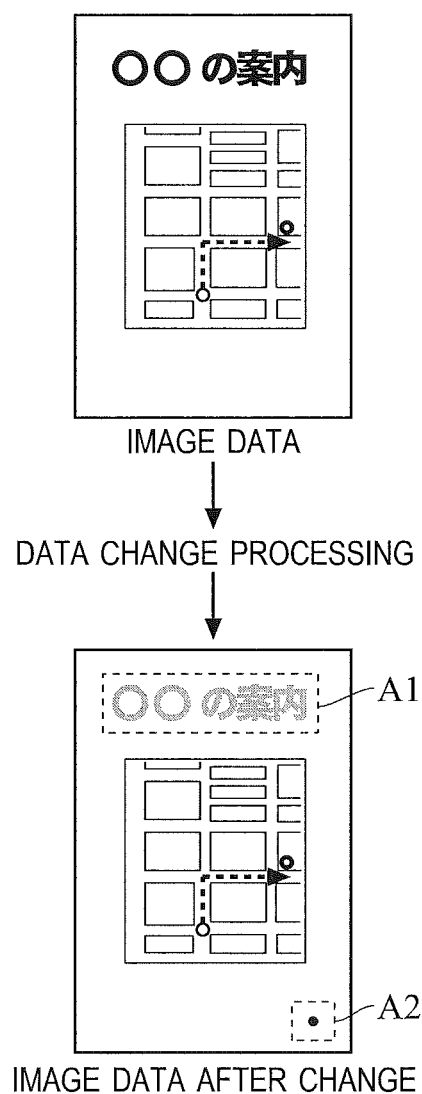
FIG. 11 is a diagram showing the flow of data change processing which is performed by the multifunctional machine according to the embodiment of the present disclosure.

In an example, it is assumed that the image data of the first data output printed material as shown in the upper figure of FIG. 11 is the processing target of the data change processing. When the data change processing on the image data is performed by the control portion 1, for example, as shown in the lower figure of FIG. 11, image data in which the color of a region A1 is changed and in which a black circle image (mark image) is added to a region A2 is newly generated.

After the output of the changed printed material, the control portion 1 determines whether or not the image reading portion 2 reads the changed printed material. Then, when the control portion 1 determines that the image reading portion 2 reads the changed printed material, the control portion 1 performs the notification processing as in the case where the image reading portion 2 reads the first data output printed material.

In the configuration in which the control portion 1 performs the data change processing, even when the first data output printed material is copied in an unauthorized manner, it is possible to prevent the printed material based on the first data from being output from the copy of the first data output printed material.

When in the multifunctional machine 100, the copy of the first data output printed material is read, the information thereof may be notified to the notification destination associated with the first data.

It should be considered that the embodiment disclosed herein is illustrative in all respects and not restrictive. The scope of the present disclosure is indicated not by the description of the embodiment discussed above but by the scope of claims, and furthermore, meanings equivalent to the scope of claims and all modifications within the scope are included.

Figure 12:
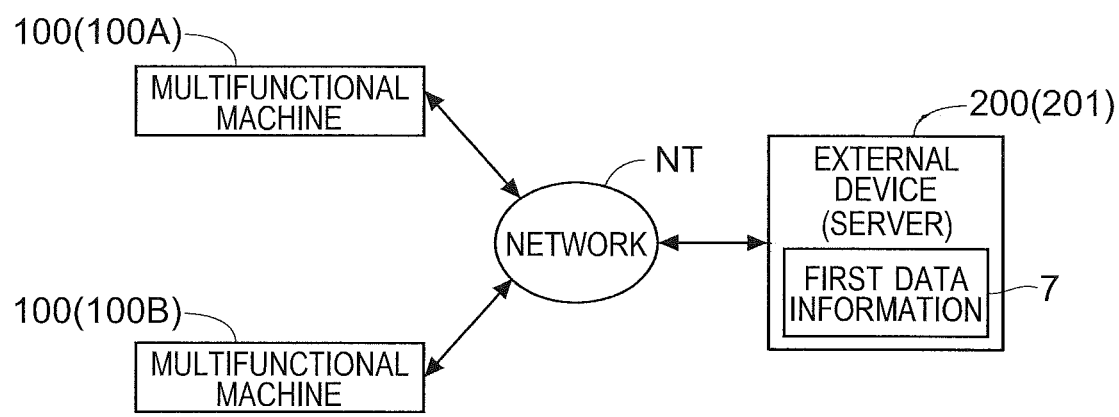
FIG. 12 is a diagram of a state where a plurality of multifunctional machines according to the embodiment of the present disclosure are connected to a server.

For example, as shown in FIG. 12, a server 201 serving as the external device 200 may be connected to the network NT and a plurality of multifunctional machines 100 may be connected to the network NT.

When in this configuration, a certain multifunctional machine 100 (here referred to as the multifunctional machine 100A) performs the security storage processing, the first data information 7 is transmitted from the multifunctional machine 100A to the server 200 so as to be stored in the server 201 and thus the multifunctional machines 100 are brought into a state where they share the first data information 7. Hence, the printed material based on the first data can be output from the multifunctional machine 100 (here, a multifunctional machine 100B) which is different from the multifunctional machine 100A.

What is claimed is:

1. An image forming apparatus comprising:
    a storage portion which stores first data and second data associated with the first data and which stores permission information for determining whether or not a permission condition for permitting output of the first data is satisfied;
    an image reading portion which reads an image;
    a print portion which prints an image; and a control portion in which whether or not a first data output printed material that is a printed material obtained by printing based on the second data is read by the image reading portion is determined, and in which when it is determined that the first data output printed material is read by the image reading portion and the permission condition is satisfied, the print portion is made to perform printing based on the first data corresponding to the second data whereas when the permission condition is not satisfied, the print portion is prevented from performing the printing based on the first data corresponding to the second data;

wherein the image reading portion includes a transport reading contact glass and a placement reading contact glass, reads, in a transport reading mode, an original document which is automatically transported to the transport reading contact glass and reads, in a placement reading mode, an original document which is placed on the placement reading contact glass, the permission information includes information indicating a permission reading mode of the transport reading mode and the placement reading mode and when image reading portion reads the first data output printed material in a mode different from the permission reading mode, the control portion determines that the permission condition is not satisfied.

2. The image forming apparatus according to claim 1, wherein the permission information includes information indicating a setting value of a setting item, the image forming apparatus includes an operation panel which receives setting of the setting item when the reading is performed by the image reading portion and when a setting value of the setting item which is set when the first data output printed material is read by the image reading portion is different from the setting value of the setting item indicated in the permission information, the control portion determines that the permission condition is not satisfied.

3. The image forming apparatus according to claim 1, comprising:

an operation panel which receives an instruction to perform user authentication, wherein the permission information includes information indicating a permission user, and when after the image reading portion reads the first data output printed material, the operation panel receives the instruction to perform the user authentication, the control portion performs the user authentication whereas when a user who provides the instruction to perform the user authentication is not the permission user, the control portion determines that the permission condition is not satisfied.

4. The image forming apparatus according to claim 3, wherein when after the image reading portion reads the first data output printed material, the operation panel does not receive the instruction to perform the user authentication within a predetermined time, the control portion determines that the permission condition is not satisfied.

5. The image forming apparatus according to claim 1, wherein the permission information includes information indicating an expiration date, and when the first data output printed material is read by the image reading portion, if a current date and time exceeds the expiration date, the control portion determines that the permission condition is not satisfied.

6. The image forming apparatus according to claim 1, wherein the permission information includes information indicating an upper limit of a number of times, and when the number of times a job involving the reading of the first data output printed material is performed reaches the upper limit of the number of times, the control portion determines that the permission condition is not satisfied.

7. The image forming apparatus according to claim 1, wherein when the control portion determines that the permission condition is not satisfied, the control portion performs processing for deleting the second data.

8. The image forming apparatus according to claim 1, comprising:

an operation panel which receives an instruction to set a first data output mode on, wherein when the operation panel receives the instruction to set the first data output mode on and then the image reading portion reads an original document, the control portion determines whether or not the image reading portion reads the first data output printed material, and when the control portion determines that the image reading portion reads the first data output printed material, if a waiting time after the operation panel receives the instruction to set the first data output mode on until the reading of the first data output printed material by the image reading portion is started exceeds a predetermined threshold time, the control portion performs processing for deleting the second data.

9. The image forming apparatus according to claim 1, wherein the storage portion stores a notification destination associated with the first data, the image forming apparatus includes a communication portion which is connected to the notification destination so as to be able to communicate with the notification destination and when the control portion determines that the permission condition is not satisfied, the control portion transmits, to the notification destination, through the communication portion, notification information indicating that the first data output printed material is read.

10. The image forming apparatus according to claim 9, wherein the control portion includes, in the notification information, details of a job involving the reading of the first data output printed material.

11. The image forming apparatus according to claim 1, wherein when the control portion performs a copy job for copying an image of the first data output printed material on a sheet, the control portion changes part of image data of the first data output printed material obtained by the reading of the image reading portion and makes the print portion perform printing based on the changed image data.

12. The image forming apparatus according to claim 1, comprising:

an operation panel which receives an instruction to set a first data storage mode on and which receives an operation, wherein the control portion acquires, as the first data, image data obtained by reading of an original document with the image reading portion in a state where the first data storage mode is set on, and when the control portion acquires the first data, the control portion makes the operation panel receive a production operation of producing the second data and a setting operation of setting the permission information, stores the first data and the second data in the storage portion such that the first data and the second data are associated with each other, stores the permission information in the storage portion such that the permission information is associated with the first data and makes the print portion perform printing based on the second data.

13. The image forming apparatus according to claim 12, comprising:
a communication portion which is connected to a server so as to be able to communicate with the server,
wherein the control portion stores the first data and the second data in the server portion such that the first data and the second data are associated with each other, and stores the permission information in the server such that the permission information is associated with the first data.

14. An image forming apparatus comprising:
a storage portion which stores first data and second data associated with the first data and which stores permission information for determining whether or not a permission condition for permitting output of the first data is satisfied;
an image reading portion which reads an image;
a print portion which prints an image; and
a control, portion in which whether or not a first data output printed material that is a printed material obtained by printing based on the second data is read by the image reading portion is determined, and in which when it is determined that the first data output printed material is read by the image reading portion and the permission condition is satisfied, the print portion is made to perform printing based on the first data corresponding to the second data whereas when the permission condition is not satisfied, the print portion is prevented from performing the printing based on the first data corresponding to the second data;
wherein the permission information includes information indicating a position of a check region, and
when the image reading portion reads the first data output printed material, the control portion performs processing for detecting a predetermined image from the check region of image data of the first data output printed material obtained by the reading and when the control portion cannot detect the predetermined image, the control portion determines that the permission condition is not satisfied.

15. An image forming apparatus comprising:
a storage portion which stores first data and second data associated with the first data and which stores permission information for determining whether or not a permission condition for permitting output of the first data is, satisfied;
an image reading portion which reads an image;
a print portion which prints an image: and
a control portion in which whether or not a first data output printed material that is a printed material obtained by printing based on the second data is read by the image reading portion is determined, and in which when it is determined that the first data output printed material is read by the image reading portion and the permission condition is satisfied, the print portion is made to perform printing based on the first data corresponding to the second data whereas when the permission condition is not satisfied, the prints portion is prevented from performing the printing based on the first data corresponding to the second data;
wherein the permission information includes information indicating reading turns, and
when the first data output printed material is read by the image reading portion, if continuous reading which continuously reads a plurality of sheets of original document including the first data output printed material is performed, the control portion determines that the permission condition is not satisfied whereas even when the continuous reading is performed, if the reading turn of the first data output printed material in the continuous reading is different from the reading turn indicated in the permission information, the control portion determines that the permission condition is not satisfied.

16. The image forming apparatus according to claim 15, wherein the permission information includes determination image data, and
when a degree of similarity between image data of the sheets of original document other than the first data output printed material read in the continuous reading and the determination image data falls below a predetermined threshold value, the control portion determines that the permission condition is not satisfied.

* * * * *